Aug. 19, 1924.
C. L. ANDERSON
SEPARATOR
Filed Aug. 31, 1920
1,505,842
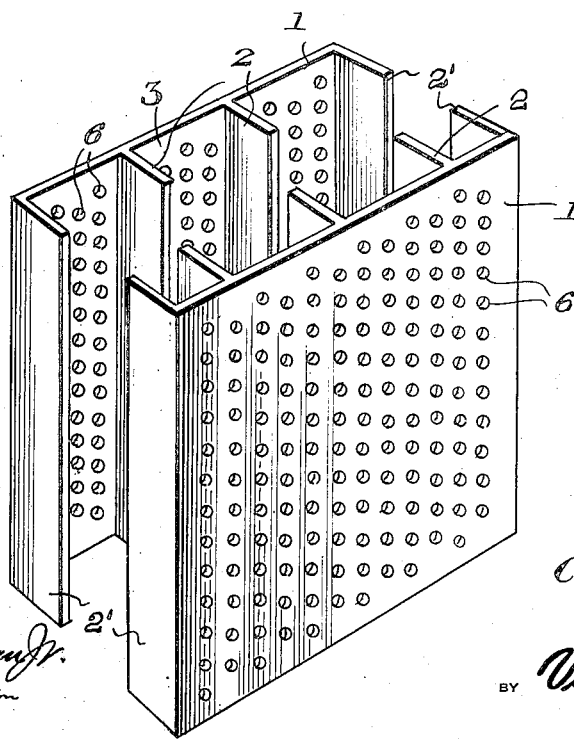
C. L. Anderson
INVENTOR
BY Victor J. Evans
ATTORNEY Patented Aug. 19, 1924.

1,505,842

UNITED STATES PATENT OFFICE.

CLYDE L. ANDERSON, OF BUTTE, MONTANA.

SEPARATOR.

Application filed August 31, 1920. Serial No. 407,113.

*To all whom it may concern:*

Be it known that I, CLYDE L. ANDERSON, a citizen of the United States, residing at Butte, in the county of Silver Bow and State of Montana, have invented new and useful Improvements in Separators, of which the following is a specification.

This invention relates to an improved separator for separating the positive and negative plates of storage batteries, the principal object of the invention being to provide a plurality of apertured strips through which sediment may pass to the bottom of the cell.

Another object of the invention is to provide means whereby the separators with the chambers or spaces therein may be easily manufactured and assembled.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

The figure is a view showing the two portions of the separator before being assembled and showing how the separator may be formed.

As shown in the drawing the separator consists of the two side plates 1 and the vertically arranged strips 2 which connect the two plates together and hold them in spaced relation, said strips 2 being spaced apart to form vertical passages or chambers 3 through which the sediment or material coming from the negative and positive plates will drop down to the bottom of the cell of the battery.

The drawing forming part of this application shows the plates as being provided with perforations 6 and how the plates can be formed to facilitate assemblage. This figure shows each plate as being provided with the strips 2, these strips being so arranged that the strips 2' at the edges of one plate can be placed in contact with those at the edges of the other plate and secured together. The intermediate strips are alternately arranged, as shown, to provide the spaces or chambers 3.

As will be understood one of these separators is placed between each pair of the battery plates so as to separate the negative battery plates from the positive plate. The material thrown off by such plates will pass through the passages or chambers formed by the strips and will drop upon the bottom of the battery.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A battery plate separator comprising side plates provided with openings, vertically arranged strips carried by each side plate and connecting the plates in spaced relation, the end strip of each plate being arranged in contacting engagement and the intermediate strips being arranged alternatively and forming vertical chambers as and for the purpose specified.

In testimony whereof, I affix my signature.

CLYDE L. ANDERSON.